US011884066B2

(12) United States Patent
Tanase et al.

(10) Patent No.: US 11,884,066 B2
(45) Date of Patent: Jan. 30, 2024

(54) PRINTING APPARATUS AND PRINTING METHOD

(71) Applicant: Seiko Epson Corporation, Tokyo (JP)

(72) Inventors: Kazuyoshi Tanase, Matsumoto (JP); Kenji Otokita, Yamagata-mura (JP); Norihiro Masuda, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/536,951

(22) Filed: Nov. 29, 2021

(65) Prior Publication Data

US 2022/0169015 A1 Jun. 2, 2022

(30) Foreign Application Priority Data

Nov. 30, 2020 (JP) ................................ 2020-198139

(51) Int. Cl.
*B41J 2/045* (2006.01)
*B41J 11/00* (2006.01)
*B41J 2/38* (2006.01)

(52) U.S. Cl.
CPC ............ *B41J 2/04563* (2013.01); *B41J 2/38* (2013.01); *B41J 11/00242* (2021.01)

(58) Field of Classification Search
None
See application file for complete search history.

(56) References Cited

U.S. PATENT DOCUMENTS

2013/0265359 A1* 10/2013 Sugaya .................. B41J 13/223 347/16
2015/0266325 A1* 9/2015 Mizutani .................. B41J 11/02 347/17

FOREIGN PATENT DOCUMENTS

WO 2016-182037 11/2016

* cited by examiner

*Primary Examiner* — Alejandro Valencia
(74) *Attorney, Agent, or Firm* — WORKMAN NYDEGGER

(57) ABSTRACT

At step S115, a printer control unit refers to a table using an average print duty as an input, and determines a saturation temperature and a drum preliminary heating temperature. In this example, since the saturation temperature and the preliminary heating temperature with respect to the print duty are stored as a table, the printer control unit refers to the table using the average print duty as the input, and determines the saturation temperature and the drum preliminary heating temperature. At step S120, the printer control unit investigates a current drum temperature based on a measurement result of a temperature sensor. Subsequently, at step S125, the drum is heated or cooled until it reaches, of the saturation temperature and the drum preliminary heating temperature, the temperature for which the difference with the current drum temperature is smaller.

5 Claims, 6 Drawing Sheets

| PRINT DUTY | SATURATION TEMPERATURE | PRELIMINARY HEATING TEMPERATURE |
|---|---|---|
| HIGH 75% | 41°C | 36°C(41°C−5°C) |
| DETERMINE BY INTERPOLATION CALCULATION | | |
| MEDIUM 50% | 38°C | 33°C(38°C−5°C) |
| DETERMINE BY INTERPOLATION CALCULATION | | |
| LOW 30% | 33°C | 27°C(33°C−5°C) |

| PRINT DUTY | SATURATION TEMPERATURE | PRELIMINARY HEATING TEMPERATURE |
|---|---|---|
| HIGH 75% | 41°C | 36°C(41°C−5°C) |
| DETERMINE BY INTERPOLATION CALCULATION | | |
| MEDIUM 50% | 38°C | 33°C(38°C−5°C) |
| DETERMINE BY INTERPOLATION CALCULATION | | |
| LOW 30% | 33°C | 27°C(33°C−5°C) |

FIG. 4

PRINTING APPARATUS AND PRINTING METHOD

The present application is based on, and claims priority from JP Application Serial Number 2020-198139, filed Nov. 30, 2020, the disclosure of which is hereby incorporated by reference herein in its entirety.

BACKGROUND

1. Technical Field

The present disclosure relates to technology for recording an image by curing, using light irradiation, a photocurable ink discharged onto a recording medium.

2. Related Art

When a recording medium is supported by a support body, and an image is recorded by curing, using light irradiation, a photocurable ink discharged onto the recording medium, the temperature of the recording medium and the support body increases due to the reaction heat.

The greater the change in the temperature of the recording medium and a drum of the support body, the greater a color difference becomes. This is because, when the temperature of the support body or the recording medium is high, fluidity of the ink after landing is high, and therefore, wet-spreading of the ink occurs more easily and the color becomes darker. Further, when the temperature of the support body and the recording medium is low, the fluidity of the ink after landing is low, and therefore, wet-spreading of the ink occurs less easily and the color becomes lighter.

For this reason, in International Patent Publication WO2016/182037, it is disclosed that the temperature of a transport surface of a transport drum is caused to be a predetermined temperature (45° C.) by heating means or cooling means before printing, and printing is started thereafter, and when a surface temperature of the recording medium is acquired during printing and the temperature has become higher than an upper limit temperature (50° C.), the printing is stopped and the transport drum is cooled.

As a result of diligent experimentation by the present inventors, it was found that the temperature change of the recording medium and the support body (the transport drum) caused by the photocurable ink varies depending on an ejection amount of the ink for each of images to be printed (hereinafter, referred to as a print duty), and a temperature difference between an image of a low print duty and an image of a high print duty is 10° C. or more. Further, it was found that when the print duty is constant, the temperature of the recording medium and the support body is stable at a constant saturation temperature corresponding to the print duty.

Therefore, as described in International Patent Publication WO2016/182037, even when the temperature of the transport surface of the transport drum is caused to be the predetermined temperature (45° C.) by the heating means or the cooling means before the printing, and the printing is started thereafter, if the print duty is different, the saturation temperature of the recording medium and of the support body will differ. As a result, a color difference corresponding to the print duty occurs between the start of the printing and after saturation.

SUMMARY

The present disclosure reduces a color difference between a start of printing and after saturation.

In an aspect of the present disclosure, a printing apparatus is configured to include a transport unit configured to transport a recording medium, a support unit configured to support the recording medium transported by the transport unit, a discharge unit located at a position facing the support unit, and configured to discharge photocurable ink onto the recording medium supported by the support unit, to form an image, a light irradiation unit configured to, downstream of the discharge unit on a transport path of the recording medium, irradiate, with light, the photocurable ink discharged onto the recording medium to cure the photocurable ink, a temperature adjustment unit configured to perform at least one of cooling or heating of the support portion, a storage unit configured to store at least one of a relationship between a print duty and a preliminary heating temperature, or a relationship formula expressing the relationship between the print duty and the preliminary heating temperature, and a control unit. The control unit acquires the print duty of the image to be printed, and adjusts the temperature adjustment unit based on the acquired print duty and the relationship or the relationship formula stored in the storage unit, to cause the support unit to be the preliminary heating temperature.

In the above-described configuration, the storage unit stores at least one of 1: the relationship between the print duty and the preliminary heating temperature, and 2: the relationship formula expressing the relationship between the print duty and the preliminary heating temperature. Then, the control unit acquires the print duty of the image to be printed, and adjusts the temperature adjustment unit based on the acquired print duty and the relationship or the relationship formula stored in the storage unit, to cause the support unit to be the preliminary heating temperature.

In this way, according to the aspect of the present disclosure, by acquiring the print duty of the image to be printed and starting printing after the preliminary heating temperature set in accordance with the acquired print duty has been reached, a color difference corresponding to the print duty does not occur even at the time of starting printing and after saturation.

BRIEF DESCRIPTION OF THE DRAWINGS

FIG. 4 is a diagram illustrating relationships between saturation temperatures and preliminary heating temperatures in the jobs having the different print duties in three stages.

DESCRIPTION OF EXEMPLARY EMBODIMENTS

An embodiment of the present disclosure will be described below with reference to the accompanying drawings.

Figure 1:
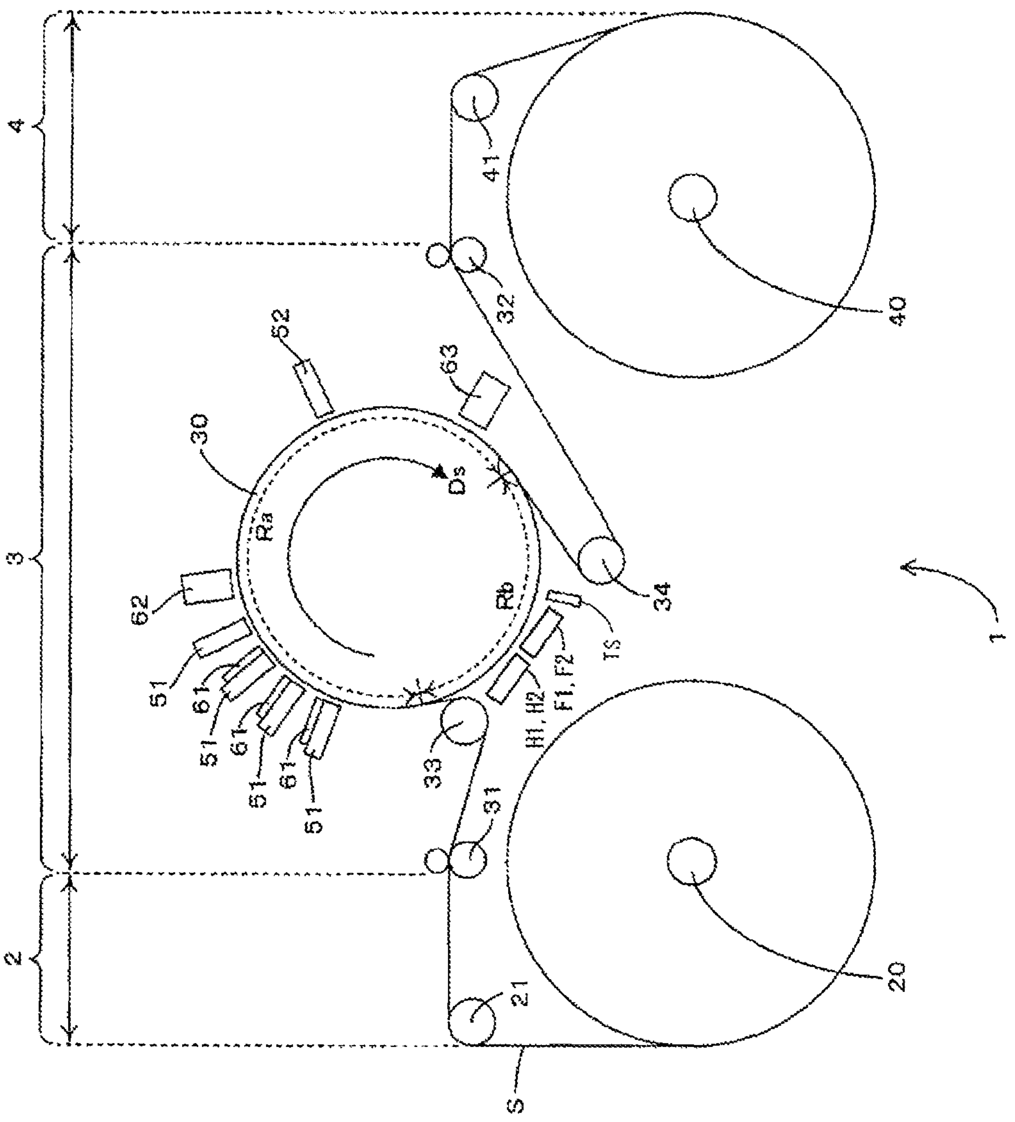
FIG. 1 is a front view illustrating an overview of a hardware configuration of a printer.

FIG. 1 is a front view illustrating an overview of a hardware configuration of a printer to which the present disclosure can be applied. As illustrated in FIG. 1, in a printer 1, a single sheet S, both ends of which are wound around a feeding shaft 20 and a winding shaft 40 in a roll shape, is stretched between the feeding shaft 20 and the winding shaft 40, and the sheet S is transported from the feeding shaft 20 to the winding shaft 40 along a path over which the sheet S is stretched in this manner. Then, in the printer 1, an image is recorded on the sheet S transported along this transport path. In overview, the printer 1 is provided with a feeding unit 2 that feeds out the sheet S from the feeding shaft 20, a process unit 3 that records the image on the sheet S fed out from the feeding unit 2, and a winding unit 4 that winds the sheet S, on which the image has been recorded in the process unit 3, around the winding shaft 40. Note that in the following description, of both surfaces of the sheet S, the surface on which the image is recorded will be referred to as a front surface and the surface on the reverse side of the front surface will be referred to as a back surface.

The feeding unit 2 includes the feeding shaft 20 around which the end of the sheet S is wound, and a driven roller 21 on which the sheet S drawn out from the feeding shaft 20 is wound. The feeding shaft 20 supports the sheet S by winding the end of the sheet S around the feeding shaft 20 with the front surface of the sheet S facing outward. Then, when the feeding shaft 20 rotates in the clockwise direction in FIG. 1, the sheet S wound around the feeding shaft 20 is fed out to the process unit 3 via the driven roller 21.

While supporting the sheet S fed out from the feeding unit 2 using a platen drum 30, the process unit 3 performs processing as appropriate, using each of functional units 51, 52, 61, 62, and 63 that are disposed along the outer circumferential surface of the platen drum 30, thus recording the image on the sheet S. In this process unit 3, a front driving roller 31 and a rear driving roller 32 are provided on both sides of the platen drum 30, and the sheet S transported from the front driving roller 31 to the rear driving roller 32 is supported by the platen drum 30 and is subjected to the image recording.

The platen drum 30 is a cylindrical drum supported so as to be able to rotate freely, and winds the sheet S transported from the front driving roller 31 to the rear driving roller 32 from the back surface side. In other words, the sheet S transported from the front driving roller 31 to the rear driving roller 32 is supported by the outer circumferential surface of the rotary drum 30. In this way, the front driving roller 31, the rear driving roller 32, and intermediate driven rollers 21, 33, 34, and 41 correspond to a transport unit that transports the recording medium. Further, the platen drum 30 corresponds to a support unit that supports the recording medium transported by the transport unit.

Then, in the process unit 3, in order to record a color image on the front surface of the sheet S supported by the platen drum 30, a plurality of the recording heads 51 corresponding to mutually different colors are provided. Specifically, four of the recording heads 51 corresponding to yellow, cyan, magenta, and black are aligned in this color order in a transport direction Ds. Each of the recording heads 51 faces the front surface of the sheet S wound on the platen drum 30 with a predetermined clearance therebetween, and discharges an ink of the corresponding color using an ink-jet method. Then, as a result of each of the recording heads 51 discharging the ink onto the sheet S transported in the transport direction Ds, the color image is formed on the front surface of the sheet S.

In this way, each of the recording heads 51 is located at a position facing the support unit, and corresponds to a discharge unit configured to discharge photocurable ink onto the recording medium supported by the support unit, to form the image.

As the ink, an ultraviolet (UV) ink (photocurable ink) that is cured by being irradiated with ultraviolet rays (light) is used. Here, in order to cure and fix the ink to the sheet S, the UV lamps 61 and 62 (a light irradiation unit) are provided in the process unit 3. Note that this ink curing is performed in two stages of provisional curing and final curing. The UV lamps 61 for the provisional curing are disposed in each of intervals between the plurality of recording heads 51. In other words, the UV lamps 61 are used for curing (provisional curing of) the ink to a degree such that the ink does not lose its shape, by irradiating the ink with relatively weak ultraviolet rays, and are not used for completely curing the ink. On the other hand, the UV lamp 62 for the final curing is provided downstream of the plurality of recording heads 61 in the transport direction Ds. In other words, the UV lamp 62 is used for completely curing (final curing of) the ink, by irradiating the ink with ultraviolet rays stronger than the ultraviolet rays of the UV lamps 61. In this way, the color image formed by the plurality of recording heads 51 can be fixed to the front surface of the sheet S by performing the provisional curing and the final curing.

As described above, the UV lamps 61 and the UV lamp 62 correspond to the light irradiation unit that irradiates the light onto and cures the photocurable ink discharged onto the recording medium, further downstream than the discharge unit on the transport path of the recording medium.

Note that the provisional curing and the final curing are performed in this example, but the curing is not necessarily performed in the two stages.

In general, when the photocurable ink is irradiated with the ultraviolet rays, reaction heat is generated. Thus, a site of the sheet S (the recording medium) at which the ink is adhered generates heat, and as a result of that heat being transferred to the platen drum 30, the temperature of the platen drum 30 increases. In this case, strictly speaking, a temperature difference occurs between the sheet S and the platen drum 30, but in this example, processing is performed on the assumption that the temperature of both the sheet S and the platen drum 30 is roughly the same.

In this way, in the present disclosure, the temperature is considered to be that of the recording medium or the support unit, without particularly distinguishing between the two.

A plurality of fans F1 and F2 are provided as a cooling mechanism for suppressing the temperature increase caused by the generated heat, and cooling the platen drum 30. Each of the fans F1 and F2 can be turned on and off individually, and a cooling intensity can be changed in a stepwise manner depending on a number of the fans that are operated.

On the other hand, a plurality of heaters H1 and H2 are provided as a heating mechanism for heating the platen drum 30 before the start of printing to a predetermined printing start temperature. Each of the heaters H1 and H2 can be turned on and off individually, and a heating intensity can be changed in a stepwise manner depending on a number of the heaters H1 and H2.

In this way, each of the fans F1 and F2 and the heaters H1 and H2 corresponds to a temperature adjustment unit capable of performing cooling or heating with respect to the support unit. In this embodiment, cooling and heating are performed, but a configuration can be adopted in which cooling alone or heating alone is performed. Further, the intensity is changed by turning the plurality of heaters and fans individually on and off, but the intensity may be adjusted by changing a conducted electric current value in a stepwise manner or continuously in a non-stepwise manner.

Further, in this embodiment, the plurality of heaters H1 and H2 are provided as the heating mechanism for heating the platen drum 30 before the start of printing to the predetermined printing start temperature, but the plurality of heaters H1 and H2 need not necessarily be provided. In this case, in order to heat the platen drum 30 before the start of printing to the predetermined printing start temperature, the photocurable ink may be discharged onto the recording medium, and the generating of the reaction heat at the same time as curing the ink by irradiating this ink with the ultraviolet rays using the UV lamps 61 may be continued until the temperature of the platen drum 30 becomes the predetermined printing start temperature.

The recording head 52 is provided downstream of the UV lamp 62 in the transport direction Ds. The recording head 52 faces the front surface of the sheet S wound on the platen drum 30 with a predetermined clearance therebetween, and discharges a transparent UV ink onto the front surface of the sheet S, using an ink-jet method. In other words, the transparent ink is further discharged onto the color image formed by the recording heads 51 of the four colors. Further, the UV lamp 63 is provided downstream of the recording head 52 in the transport direction Ds. This UV lamp 63 is used for completely curing (final curing of) the transparent ink discharged by the recording head 52, by irradiating the transparent ink with strong ultraviolet rays. In this way, the transparent ink can be fixed to the front surface of the sheet S.

As described above, the sheet S is supported by being wound around the platen drum 30. The sheet S wound around a winding portion Ra of the outer circumferential surface of the platen drum 30 in this manner is irradiated with the ultraviolet rays, to cure the UV ink that has landed on the front surface of the sheet S. Then, in the process unit 3, in order to suppress an increase in the temperature of the UV ink at that time, the platen drum 30 is cooled by the fans F1 and F2 to cause the heat generated by the UV ink to escape to the platen drum 30. Furthermore, when the temperature of the platen drum 30 is lower than the saturation temperature at the start of the printing, the platen drum 30 is heated by the heaters H1 and H2 to increase the temperature of the platen drum 30.

Next, an electrical configuration for controlling the printer 1 will be described.

Figure 2:
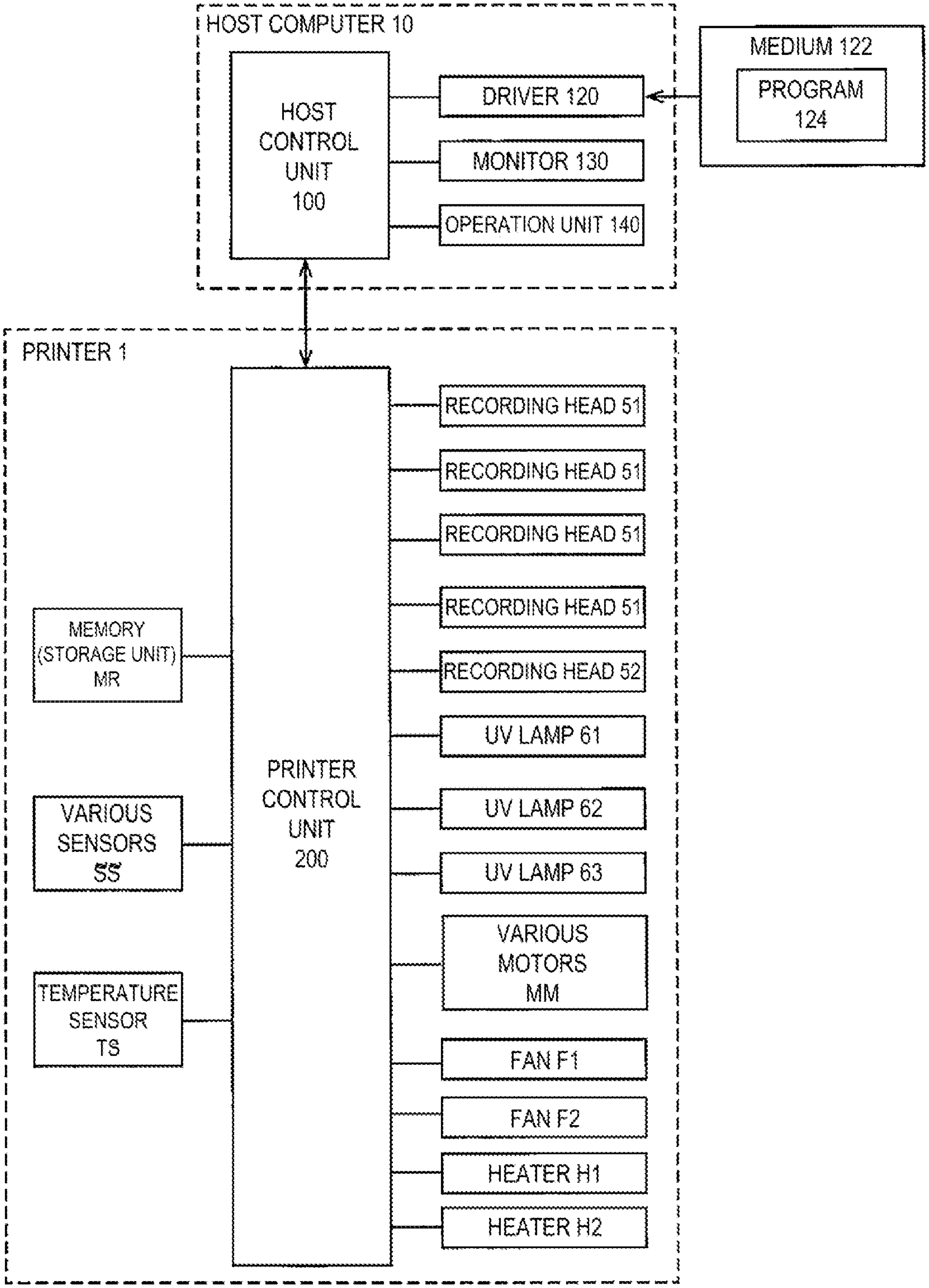
FIG. 2 is a block diagram schematically illustrating an electrical configuration for controlling the printer.

FIG. 2 is a block diagram schematically illustrating the electrical configuration for controlling the printer illustrated in FIG. 1. The operations of the printer 1 described above are controlled by a host computer 10 illustrated in FIG. 2. In the host computer 10, a host control unit 100 that manages control operations is configured by a central processing unit (CPU) and a memory. Further, a driver 120 is provided in the host computer 10, and the driver 120 reads out a program 124 from a medium 122. Note that various devices can be used as the medium 122, such as a compact disk (CD), a digital versatile disk (DVD), a universal serial bus (USB) memory, and the like. Then, the host control unit 100 controls each of units of the host computer 10 and controls the operations of the printer 1 based on the program 124 read out from the medium 122.

Furthermore, as an interface with an operator, the host computer 10 is provided with a monitor 130 configured by a liquid crystal display and the like, and an operation unit 140 configured by a keyboard, a mouse, and the like. In addition to an image to be printed, a menu screen is displayed on the monitor 130. Therefore, by operating the operation unit 140 while viewing the monitor 130, the operator can open a printing setting screen from the menu screen, and can set various printing conditions, such as a type of the printing medium, a size of the printing medium, a printing quality, and the like. Note that various modifications are possible in the specific configuration of the interface with the operator. For example, a touch panel type display may be used as the monitor 130, and the operation unit 140 may be configured by the touch panel of the monitor 130.

On the other hand, the printer 1 is provided with a printer control unit 200 that controls each of the units of the printer 1 in accordance with commands from the host computer 10. Then, the recording heads, the UV lamps, and each of the device units of the sheet transport system are controlled by the printer control unit 200. Details of the control by the printer control unit 200 for each of the device units are as follows. The printer control unit 200 is provided with a memory MR as a storage unit. Note that the printer control unit 200 corresponds to a control unit of the present disclosure.

The printer control unit 200 has a function of controlling the transport of the sheet S described above in detail with reference to FIG. 1. In other words, a motor is connected to each of the feeding shaft 20, the front driving roller 31, the rear driving roller 32, and the winding shaft 40, of the members configuring the sheet transport system. Then, using detection results of various sensors SS, the printer control unit 200 controls the speed and torque of each of motors MM while rotating the motors MM, thus controlling the transport of the sheet S. Further, the printer control unit 200 is provided with a temperature sensor TS that measures the surface temperature of the platen drum 30. While the temperature sensor TS measures the surface temperature of the platen drum 30, the sheet S is transported whilst in contact with the surface of the platen drum 30, and the temperature of the recording medium and the platen drum 30 are substantially the same.

Figure 3:
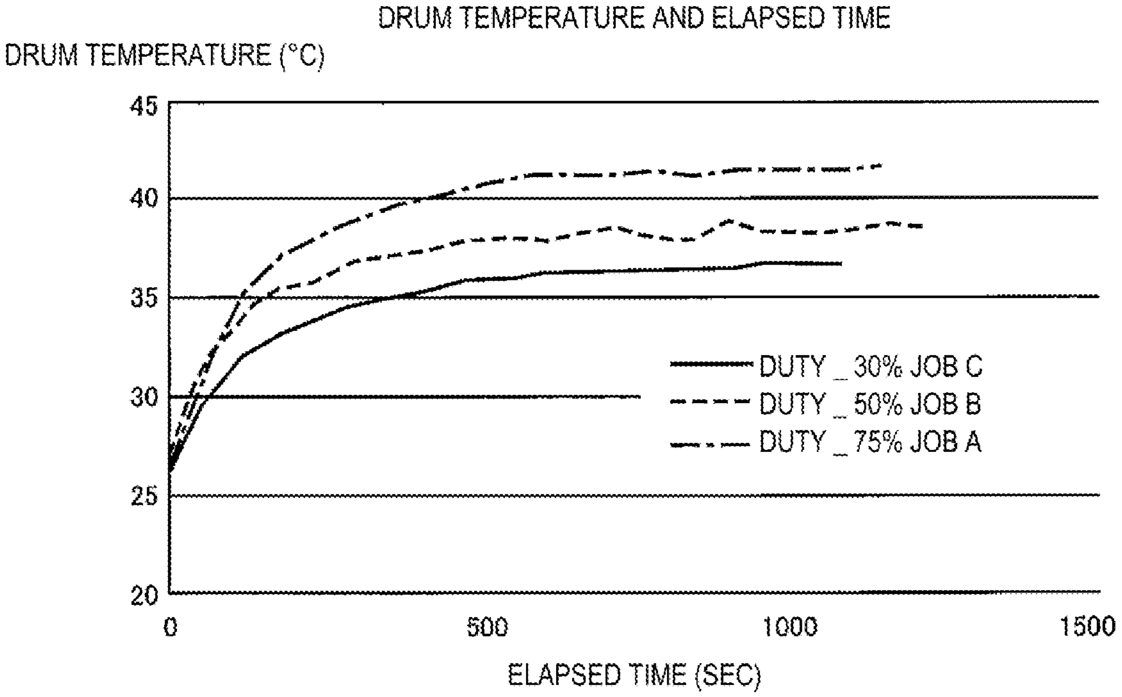
FIG. 3 is a diagram illustrating temperature changes in a plurality of print jobs having different print duties.

FIG. 3 is a graph showing changes over time in the temperature of the platen drum 30 from the start of printing, when performing three jobs having different print duties (a job A, a job B, and a job C). When an ambient temperature is assumed at start-up, due to the heat reaction generated by irradiating the photocurable ink with the ultraviolet rays, when the printing is continuously performed, the temperature of the platen drum 30 increases. However, although there is also an effect of natural heat dissipation and the temperature increases in accordance with each of the print duties, it can be seen that a constant saturation temperature is maintained after a predetermined time period elapses.

As described above, the wet-spreading of the ink varies depending on the temperature of the printing medium or the support body, and this variation affects the image quality. Thus, when the temperature difference between the temperature at the start of the printing and the saturation temperature is large, the difference in image quality will also increase. Therefore, if a magnitude of the difference in image quality is to be kept within a certain range, for example, a color difference $\Delta E$ is to be less than 1.0 degrees, which is not likely to be perceived by the human eye, it is necessary to keep the temperature difference between the temperature at the start of printing and the saturation temperature within a certain range.

FIG. 4 shows relationships between the saturation temperatures and preliminary heating temperatures in the three jobs having the print duties that differ in three stages.

When the print duty differs, the saturation temperature differs in each case. The temperature at the start of the printing for which the difference between the image quality at each of the saturation temperatures and the image quality at the start of the printing results in the color difference $\Delta E$ being in the range of less than 1.0 degrees can be determined via experimentation, and in FIG. 4, the temperature is displayed as the preliminary heating temperature. This is because, by preliminarily heating the platen drum 30 before the start of the printing, the difference between the temperature at the start of the printing and the saturation temperature can be reduced, and as a result, it is possible to cause the image quality at the start of the printing not to significantly deviate from the image quality when the saturation temperature has been reached.

When the color difference ΔE is less than 1.0 degrees, the difference is not likely to be perceived by the human eye. This means that, in a single print job, changes in the image quality between a printed material and another printed material at any timing cannot be visually perceived. In other words, a user will perceive the printed materials as being substantially uniform.

In the example shown in FIG. 4, the higher the print duty, the higher the saturation temperature. Such a relationship is observed because the reaction heat is assumed to be proportional to a unit mass of the photocurable ink. Further, with respect to any of the print duties, the preliminary heating temperature is 5 degrees lower than the saturation temperature.

Further, while the saturation temperature and the preliminary heating temperature are experimentally determined when the print duty is high (75%), when the print duty is medium (50%), and when the print duty is low (30%), the saturation temperature and the preliminary heating temperature are determined by performing an interpolation calculation when the print duty does not match one of these print duties. Interpolation calculation formulas are too numerous to mention, but may be an interpolation calculation formula that obtains an average value as a simple proportional gradient, or an arithmetic formula representing a curve that is obtained by calculating that curve smoothly connecting three points.

Further, instead of performing the calculation every time the printing is performed, the calculation may be performed in advance in 1% increments and stored in a table. The storing in the table corresponds to storing a relationship, and the representing the arithmetic formula corresponds to storing a relationship formula.

Since the higher the print duty is, the higher the saturation temperature becomes, basically, when it is assumed that a first temperature corresponds to the preliminary heating temperature when the print duty is a first duty value, it can be said that when the print duty is a second duty value that is higher than when the print duty is the first duty value, a second temperature that is higher than the first temperature corresponds to the preliminary heating value.

The saturation temperature described above represents the temperature at which the temperature increase of the support unit becomes saturated, when the processing for curing the photocurable ink is performed continuously by irradiating the recording medium on which the image has been printed, with the light from the light irradiation unit. When the difference in changes in the image quality is considered as a change of color of the image, causing the color change ΔE to be within a certain range corresponds to starting the printing when the temperature is within a certain temperature range from the saturation temperature, and thus, the preliminary heating temperature is set to be a temperature different by a first temperature difference from the saturation temperature at which the temperature increase of the support unit becomes saturated. Here, when the saturation temperature is set to the first temperature, this can be referred to as being the temperature different from the saturation temperature by the first temperature difference, and when the saturation temperature is set to the second temperature, this can be referred to as being the temperature different from the saturation temperature by a second temperature difference.

In the example shown in FIG. 4, the first temperature difference and the second temperature difference are the same value. However, the first temperature difference and the second temperature difference are not limited to always being the same.

In other experimentation results, when the saturation temperature was high, a degree of increase in the saturation temperature and a degree of change in the image quality were not in a proportional relationship, and the degree of change in the image quality was gradual when the saturation temperature increased. In other words, in a region where the saturation temperature was high, the first temperature difference when the saturation temperature was low was lower than the second temperature difference when the saturation temperature was higher. In other words, the second temperature difference was higher than the first temperature difference.

As described above, when the color difference ΔE between the image printed at the saturation temperature and the image printed at the preliminary heating temperature that is separated from this saturation temperature by the first temperature difference is less than 1.0 degrees, it is assumed that a typical person cannot visually perceive this color difference.

Furthermore, a configuration may be adopted in which the user can set a fluctuation range of the image quality that can be permitted using the user interface, and when the user reduces the fluctuation range of the image quality, the values of the first temperature difference and the second temperature difference may be set to be smaller than when the fluctuation range is set to be larger.

Next, operations of this embodiment having the configuration described above will be described.

Figure 5:
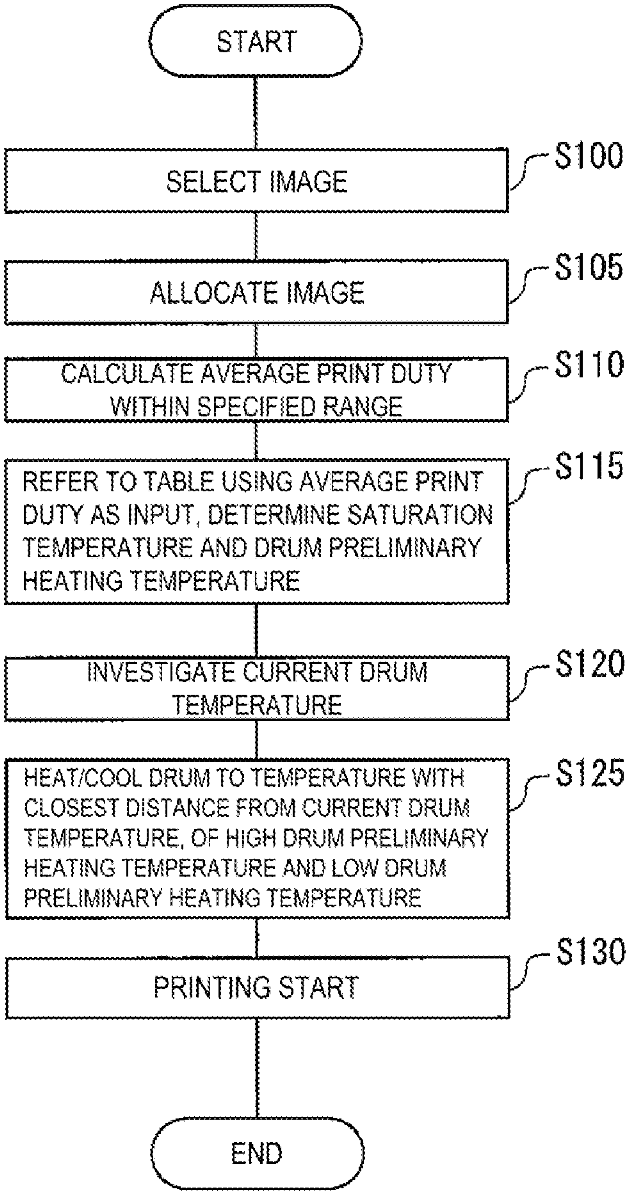
FIG. 5 is a flowchart of a printer control unit.

FIG. 5 is a flowchart of the printer control unit.

The printer control unit 200 performs image selection at step S100. This corresponds to image printing from the user. When the user instructs the printing, the printer control unit 200 recognizes the print image and performs the image selection. Subsequently, at step S105, the printer control unit 200 allocates the selected image in the recording medium. Normally, the printing can be started at this stage, but in the present disclosure, at step S110, the printer control unit 200 calculates an average print duty within a specified range. Since the print duty varies depending on a section, the average print duty is calculated within a predetermined range. The amount of heat generated by the photocurable ink is considered to be proportional to the total amount of ink ejected.

More specifically, for the amount of heat generated, the amount of heat generated can be calculated for each of the ink colors and reflected. For example, in the case of ink colors for which a large amount of heat is generated, the average print duty may be corrected to be larger.

Furthermore, as illustrated in FIG. 1, in this embodiment, the photocurable ink discharged from the recording heads 51 of the discharge unit for the four colors is provisionally cured. However, a heat amount by which the platen drum 30 is heated by the heat generated at that time can be said to differ depending on the positions of the recording heads 51 for the four colors. Specifically, for the ink color that is discharged first, the amount of heat that heats the platen drum 30 is large, and thus, a weighting of that ink color with respect to the print duty may be increased, while, for the ink color that is discharged last, the amount of heat that heats the platen drum 30 is small, and thus, a weighting of that ink color with respect to the print duty may be reduced.

Subsequently, at step S115, the printer control unit 200 refers to a table using the average print duty as an input, and determines the saturation temperature and the drum preliminary heating temperature. In this embodiment, the saturation temperature and the drum preliminary heating temperature for the print duty are stored as the table, and thus the printer control unit 200 refers to the table using the average print duty as the input, to determine the saturation temperature and drum preliminary heating temperature.

At step S120, the printer control unit 200 investigates the current drum temperature based on a measurement result of the temperature sensor TS. Subsequently, at step S125, the drum is heated or cooled until it reaches, of the saturation temperature and the drum preliminary heating temperature, the temperature for which the difference with the current drum temperature is smaller.

A description will be made with reference to the example shown in FIG. 4.

Assuming that the average print duty calculated by the printer control unit 200 at step S110 is 50%, the saturation temperature determined at step S115 is 38 degrees, and the preliminary heating temperature set based on this is 33 degrees. Then, it is assumed that the temperature of the platen drum 30 obtained at step S120 is 25 degrees.

From the information indicating that the current drum temperature is 25 degrees, the saturation temperature is 38 degrees, and the preliminary heating temperature is 33 degrees, the printer control unit 200 can determine that the current drum temperature is closer to the preliminary heating temperature than to the saturation temperature, and furthermore, starts the heating of the platen drum 30 using the heaters H1 and H2 until the current drum temperature reaches the preliminary heating temperature.

The printer control unit 200 stands by until the current drum temperature reaches the preliminary heating temperature, and, once the current drum temperature reaches the preliminary heating temperature, starts the printing at step S130. Note that feedback control is performed in this embodiment, but a method that does not utilize the measurement result of the temperature sensor TS, that is, a method using a simple feed-forward control, is also possible.

On the other hand, a case is also assumed in which the print jobs are continuous, and at this time, a previous print job has an average print duty that is high at 75% and a latter print job has an average print duty that is low at 30%.

In this case, at a time point at which the latter print job is started, the current drum temperature of the platen drum 30 is the saturation temperature of 41 degrees obtained when the average print duty is 75%. At this time, at step S125, from the information indicating that the current drum temperature is 41 degrees, the saturation temperature is 38 degrees, and the preliminary heating temperature is 33 degrees, the printer control unit 200 can determine that the current drum temperature is closer to the saturation temperature than to the preliminary heating temperature, and, furthermore, starts the cooling of the platen drum 30 using the fans F1 and F2 until the current drum temperature reaches the saturation temperature.

Then, once the printer control unit 200 has performed the cooling until the current drum temperature reaches the saturation temperature, the printer control unit 200 starts the printing at step S130.

In this embodiment, when the cooling is necessary, the printer control unit 200 cools the temperature to the saturation temperature and stands by, and when the heating is necessary, the printer control unit 200 stands by until the temperature reaches the preliminary heating temperature that is lower than the saturation temperature. However, a configuration may be adopted in which, even when the cooling is necessary, a preliminary (cooling) temperature is set at which the printing may be started before reaching the saturation temperature, the printing is started before the platen drum 30 reaches the saturation temperature, and the printing is performed while gradually lowering the temperature to the saturation temperature.

Figure 6:
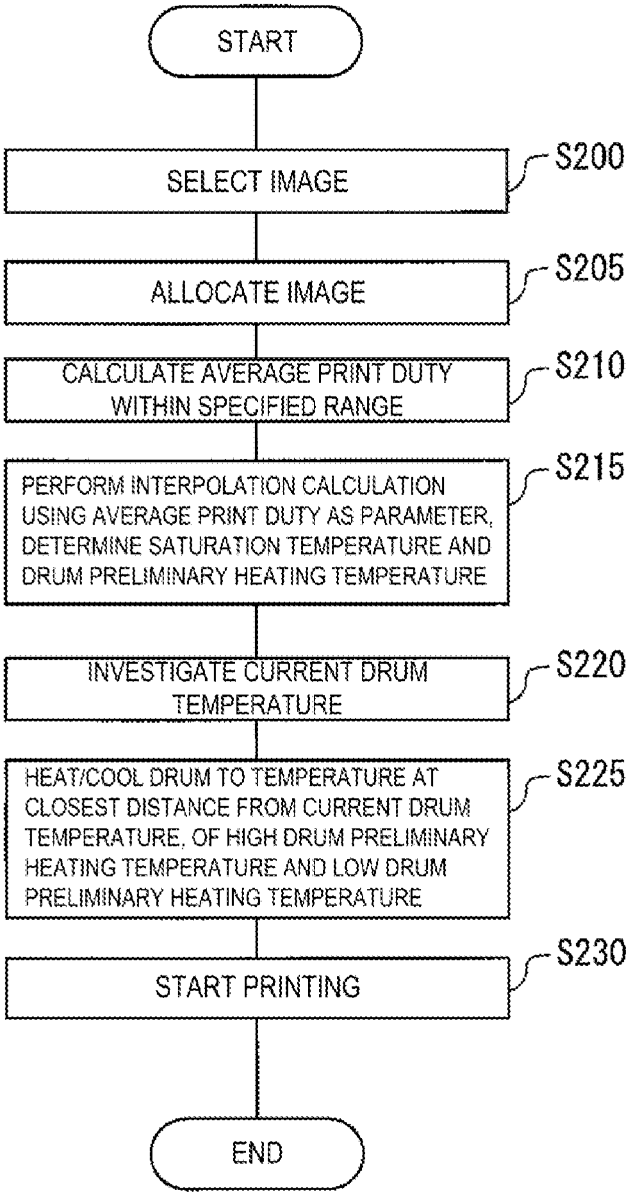
FIG. 6 is a flowchart of the printer control unit.

FIG. 6 is a flowchart of the printer control unit according to a modified example.

In the flowchart illustrated in FIG. 5, at step S115, the table is referred to using the average print duty as the input, and the saturation temperature and the preliminary heating temperature are determined. However, in processing of the flowchart illustrated in FIG. 6, at step S215, an arithmetic formula is performed using the average print duty as a parameter, and the saturation temperature and the drum preliminary heating temperature are calculated. In the flowchart illustrated in FIG. 6, the processing differs in that the arithmetic processing is performed based on the parameter each time, but the remaining processing is the same.

As described above, the printer including the printer control unit 200 can be understood to be a printing apparatus of the disclosure, but it goes without saying that each step of the processing that is performed in a chronological manner by the printer control unit 200, as illustrated in FIG. 5 and FIG. 6, can be understood to be a printing method of the present disclosure.

In other words, the printer 1 according to this embodiment can be said to perform processes including:

storing at least one of a relationship between a print duty of the image and a preliminary heating temperature, or a relationship formula expressing the relationship between the print duty of the image and the preliminary heating temperature;

acquiring the print duty of the image to be printed; and based on the acquired print duty and the relationship or the relationship formula stored in the storage unit, adjusting the temperature adjustment unit to cause the support unit to be the preliminary heating temperature.

Note that it goes without saying that the present disclosure is not limited to the examples described above. To a person skilled in the art, it goes without saying that the following is disclosed as an example of the present disclosure.

Combinations of mutually interchangeable members, configurations and the like disclosed in the examples above may be changed and applied as appropriate.

Although not disclosed in the examples above, members, configurations, and the like of known technology that can be mutually interchanged with the members, configurations, and the like disclosed in the examples above may be replaced as appropriate, and combinations thereof may be changed and applied.

Although not disclosed in the examples above, a person skilled in the art may appropriately replace members, configurations, and the like that may be conceived as a substitute for the members, configurations, and the like disclosed in the examples above, based on known technology or the like, and may change and apply combinations thereof.

What is claimed is:

1. A printing apparatus comprising:

a transport unit configured to transport a recording medium;

a support unit configured to support the recording medium transported by the transport unit;

a discharge unit located at a position facing the support unit, and configured to discharge photocurable ink onto the recording medium supported by the support unit, to form an image;

a light irradiation unit configured to, downstream of the discharge unit on a transport path of the recording medium, irradiate, with light, the photocurable ink discharged onto the recording medium to cure the photocurable ink;

a temperature adjustment unit configured to perform at least one of cooling or heating of the support portion;

a storage unit configured to store at least one of a relationship between a print duty and a preliminary heating temperature, or a relationship formula expressing the relationship between the print duty and the preliminary heating temperature; and a control unit, wherein the control unit acquires the print duty of the image to be printed, determines the preliminary heating temperature and a saturation temperature based on the print duty, and adjusts the temperature adjustment unit, based on the acquired print duty and the relationship or the relationship formula stored in the storage unit, to cause the recording medium or the support unit to reach the preliminary heating temperature, wherein for the relationship or the relationship formula stored in the storage unit, a first preliminary heating temperature and a first saturation temperature correspond to the preliminary heating temperature and the saturation temperature, respectively, when the print duty is a first duty value, and a second preliminary heating temperature and a second saturation temperature correspond to the preliminary heating temperature and the saturation temperature, respectively, when the print duty is a second duty value, the second preliminary heating temperature being higher than the first preliminary heating temperature and the second duty value being higher than the first duty value, wherein a first temperature difference is a difference between the first preliminary heating temperature and the first saturation temperature, when the image of the first duty value is printed on the recording medium using the photocurable ink and processing is performed on the recording medium immediately after the image is printed thereon, to cure the photocurable ink by irradiating the photocurable ink with the light from the irradiation unit, wherein a second temperature difference is a difference between the second preliminary heating temperature and the second saturation temperature, when the image of the second duty value is printed on the recording medium using the photocurable ink and processing is performed on the recording medium immediately after the image is printed thereon, to cure the photocurable ink by irradiating the photocurable ink with the light from the irradiation unit, and wherein the first temperature difference and the second temperature difference are same.

2. The printing apparatus according to claim 1, wherein the first temperature difference is lower than the second temperature difference.

3. The printing apparatus according to claim 1, wherein a color difference ΔE between an image printed at the saturation temperature and an image printed at a temperature different from the saturation temperature by the first temperature difference is less than 1.0.

4. The printing apparatus according to claim 1, wherein when a fluctuation range of an image quality is reduced, a value of the first temperature difference and a value of the second temperature difference are reduced, based on a setting relating to the fluctuation range of the image quality.

5. The printing apparatus according to claim 1, comprising:

a temperature sensor configured to measure a temperature of the recording medium or the support unit, wherein the control unit adjusts the temperature adjustment unit, based on a measurement result of the temperature sensor, to cause the recording medium or the support unit to reach the preliminary heating temperature.

* * * * *